United States Patent [19]

Honda et al.

[11] Patent Number: 4,538,234
[45] Date of Patent: Aug. 27, 1985

[54] ADAPTIVE PREDICTIVE PROCESSING SYSTEM

[75] Inventors: Masaaki Honda, Tokyo; Fumitada Itakura, Hoya; Nobuhiko Kitawaki, Iruma, all of Japan

[73] Assignee: Nippon Telegraph & Telephone Public Corporation, Tokyo, Japan

[21] Appl. No.: 414,266

[22] Filed: Sep. 2, 1982

[30] Foreign Application Priority Data

Nov. 4, 1981 [JP] Japan ................. 56-177564

[51] Int. Cl.$^3$ ............................... G10L 1/00
[52] U.S. Cl. .................... 364/513.5; 381/31
[58] Field of Search ............ 381/31; 375/26, 122

[56] References Cited

U.S. PATENT DOCUMENTS 4,184,049 1/1980 Crochiere et al. ............. 381/31
4,216,354 8/1980 Esteban et al. ............... 381/31
4,401,855 8/1983 Broderson et al. ............ 381/31

Primary Examiner—E. S. Matt Kemeny
Attorney, Agent, or Firm—Pollock, Vande Sande and Priddy

[57] ABSTRACT

An adaptive predictive coding (APC) and adaptive kit allocation (ABA) system which splits a speech signal into a plurality of bands, subjecting each signal to adaptive predictive coding and adaptively changes quantization characteristics in the adaptive predictive coding so that quantization noise may become small. An average amplitude (not average power) of the signal of each band is detected for each temporal sub-interval, and a quantization bit number and a quantization step size are adaptively determined from the average amplitude for each sub-interval, thereby permitting reduction of the quantity of hardware used.

15 Claims, 15 Drawing Figures

ADAPTIVE PREDICTIVE PROCESSING SYSTEM

BACKGROUND OF THE INVENTION

The present invention relates to an adaptive predictive processing system which encodes, for instance, a speech signal or musical signal, into predictive codes adaptively changing its coding characteristics in accordance with its property, or adaptively decodes the speech signal or musical signal from such encoded codes.

A conventional adaptive predictive coding system is one that encodes the difference (a prediction residual) between a value linearly predicted from several previous sample values of an input signal and a current input sample value and transmits the encoded difference. Various modifications can be effected according to the arrangements of a predictor and a quantizer employed. For an unsteady input signal, such as a speech signal, it has been proposed to improve the signal-to-quantization noise ratio (SN ratio) by changing the prediction coefficient and the quantization step size to comply with the statistic property of the signal. With the prior art adaptive predictive coding system, however, a bit rate above 32 Kb/s is needed for achieving quality equal to the toll quality and, at the bit rates below 16 Kb/s, the SN ratio is abruptly degraded and the quality is also markedly deteriorated by the quantization noise. Accordingly, the conventional system is not satisfactory.

An adaptive predictive coding system with adaptive bit allocation has been proposed as a system for improving such performance degradation in the adaptive predictive coding at low bit rates (see, for example, Japanese Patent Application. No. 42858/79, Pat. Disc. No. 13541/80 or Proc. of 1982 IEEE ICASSP, pp 1672-1675, May 1982, "Adaptive Bit Allocation Scheme Predictive Coding of Speech"). According to this system, the quantization bit number and the quantization step size of a quantizer are adapted in accordance with non-uniformness in both of a frequency domain and a time domain of residual power, and the prediction coefficient is computed from an autocorrelation coefficient of the input signal using a linear predictive analysis and adapted for each short time interval. Since this conventional system involves the computation of the autocorrelation and the residual power for the adaptation of the quantization bit number, the quantization step size and the prediction coefficient, the word length representing these quantities has to be about twice the word length of the input signal in the case of implementing the system and a high-speed multiplier is required, resulting in the scale of hardware inevitably becoming large. Moreover, this system calls for transmission of the prediction coefficient to the receiving side separately of the residual signal.

SUMMARY OF THE INVENTION

It is therefore an object of the present invention to provide an adaptive predictive coding system which permits transmission of a high quality speech signal even at relatively low bit rates in the range of 8 to 16 Kb/s and allows real-time processing with relatively small scale hardware.

Another object of the present invention is to provide an adaptive predictive coding system which does not necessitate the transmission of the prediction coefficient to the receiving side and hence is high in coding efficiency by that and highly stable.

Yet another object of the present invention is to provide an adaptive predictive decoding system which performs adaptive predictive decoding of a code obtained by adaptation processing of a predictor and a quantizer.

According to the present invention, an input signal, such as a speech signal, is split into a plurality of frequency bands and the split signals are subjected to adaptive predictive coding for each band. At the same time, an average amplitude of pseudo-prediction residual in each sub-interval obtained by dividing the time axis for each band is detected and the quantization bit number and the quantization step size of a quantizer in the predictive coding for each corresponding band are adaptively changed in inter-band and time directions, thereby reducing a quantization error. In addition, since the adaptive change of the quantization bit number and the quantization step size is carried out by detecting the average amplitude of the pseudo-prediction residual corresponding to the prediction residual in the predictive coding in each band, the word length for computation processing therefor is reduced, making it possible to reduce the scale of the hardware employed. Furthermore, each predictive coder is formed by a lattice type digital filter. According to an embodiment of the present invention, a PARCOR coefficient is successively estimated from a locally decoded signal and, by forming a predictive filter for decoding in the same manner as the predictive code, the PARCOR coefficient need not be transmitted to the receiving side.

DESCRIPTION OF THE PREFERRED EMBODIMENTS

Figure 1:
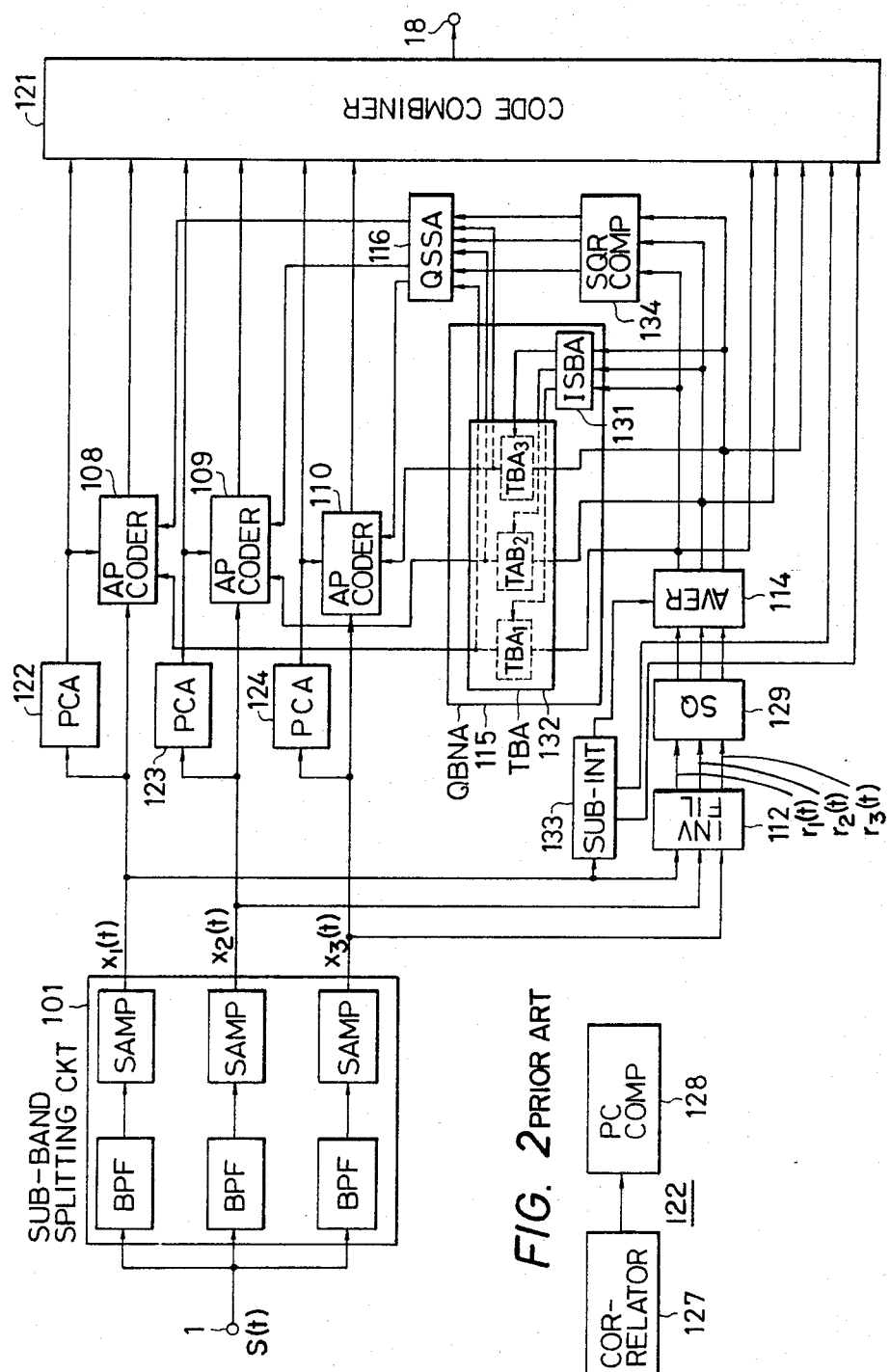
FIG. 1 is a block diagram showing a conventional adaptive predictive coding system.

To facilitate a better understanding of the present invention, a brief description will be given first, with reference to FIG. 1, of the aforementioned conventional adaptive predictive coding system of the type adaptively changing the quantization characteristics. A sampled input signal S(t) of a speech in digital form, which is supplied from an input terminal 1, is split by sub-band splitting circuit 101, for instance, into three frequency bands and, at the same time, translated into sub-band signals $x_1(t)$, $x_2(t)$, $x_3(t)$. The sub-band signals are subjected to adaptive predictive coding by adaptive predictive coders 108, 109 and 110, and the coded outputs of their residual signals are provided to a code combiner 121. The adaptive predictive coders 108, 109 and 110 are each what is called a forward type, and recursive filters are used in predictors. From the sub-band signals are computed, by predictive coefficient adaptation circuits 122, 123 and 124, prediction coefficients, by which are adaptively modified the constants of filters of the predictors in the adaptive predictive coders 108, 109 and 110. The predictive coefficient adaptation circuit 122 is constructed as shown in FIG. 2. The autocorrelation coefficients of the sub-band signal are computed by a correlator 127, and simultaneous linear equations using the computation result as a variable are solved by a predictive coefficient computation circuit 128 to obtain the prediction coefficient. The predictive coefficient adaptation circuits 123 and 124 are also identical in construction with the predictive coefficient adaptation circuit 122. The prediction coefficients obtained by the predictive coefficient adaptation circuits 122, 123 and 124 are supplied to the code combiner 121, too.

Figure 2:
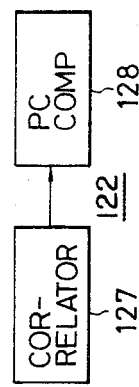
FIG. 2 is a block diagram showing the arrangement of a predictive coefficient adaptation circuit 122 used in FIG. 1.

In FIG. 1, from the sub-band signals $x_1(t)$, $x_2(t)$, $x_3(t)$ are derived by an inverse filter 112 pseudo-residual signals $r_1(t)$, $r_2(t)$, $r_3(t)$ respectively corresponding to the residual signals in the adaptive predictive coders 108 to 110. The pseudo-residual signals thus obtained are squared by a square computation circuit 129 to obtain power signals, which are averaged by an averager 114 to provide average powers of the pseudo-residual signals. The average powers of the pseudo-residual signals are supplied to an inter-sub-band bit allocation circuit 131 in a quantization bit number adaptation circuit 115. In the inter-sub-band bit allocation circuit 131 the quantization bit number allocation to the frequency bands is effected based on the rate of power among the three pseudo-residual signals and then, in a temporal bit allocation circuit 132, a quantization bit allocation adaptively takes place in accordance with the temporal localization of the powers of the pseudo-residual signals. As a time interval for changing the bit allocation with time, the pitch of the input speech signal is detected and the pitch period is divided at equal intervals into sub-intervals, which are set with respect to an analysis frame. The setting of the sub-intervals is carried out by a sub-interval setting circuit 133. For each sub-interval the average power of the pseudo-residual signal is obtained and the quantization bit allocation is performed.

The average powers of the pseudo-residual signals are subjected to square root computation by a square root computation circuit 134, and the thus computed square roots and the quantization bit numbers determined by the quantization bit number allocation circuit 115 are applied to a quantization step size adaptation circuit 116, in which the quantization step size for each band is adaptively determined for each sub-interval. The quantization bit numbers and the quantization step sizes thus determined are set in quantizers in the adaptive predictive coders 108 to 110 corresponding to the sub-bands, respectively. The quantization bit numbers and the quantization step sizes are determined so that quantization error power may be small. Data indicating the average powers of the pseudo-residual signals from the averager 114, the pitch period from the sub-interval setting circuit 133 and the positions of the sub-intervals relative to the analysis frame are provided to the code combiner 121. The code combiner 121 encodes the data as a whole and derives the encoded output at an output terminal 18.

According to the prior art adaptive predictive coding system described above, a quality substantially equal to PCM (six bits) of 48 Kb/s can be obtained at a bit rate of 16 Kb/s. Since the predictive adaptation processing and the quantization adaptation processing take place based on power, however, this system has the defect that the quantity of hardware needed is large. Furthermore, since the adaptive predictive coders 108 to 110 are of the forward type, the prediction coefficients have to be transmitted, resulting in the coding efficiency being lowered by that. Incidentally, in the case of employing recursive filters in the predictors and arranging the adaptive predictive coders in a backward type, the condition for stabilization is not dependent on the prediction coefficients, so that when the prediction coefficients are adapted, no stability can be ensured.

Figure 3:
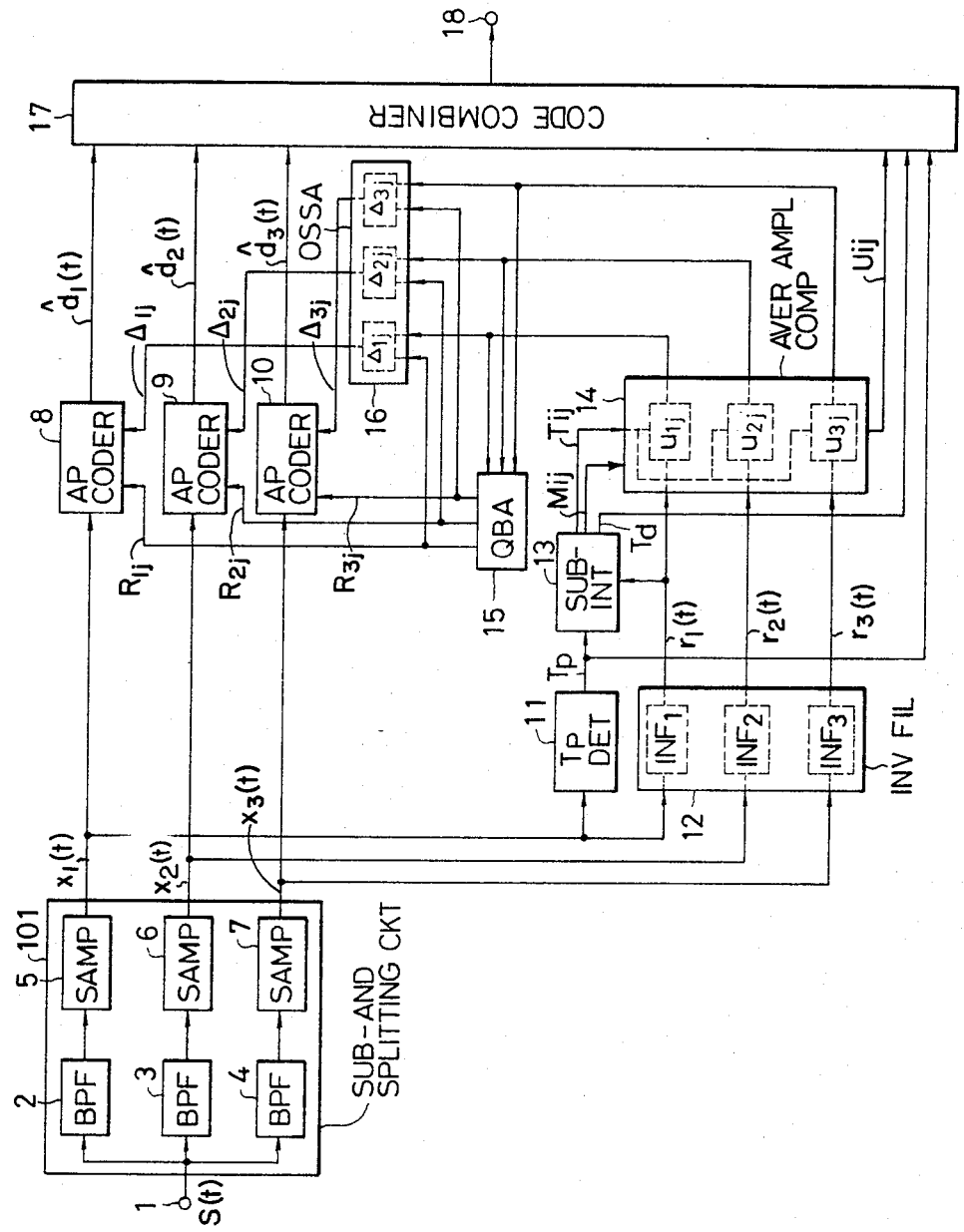
FIG. 3 is a block diagram illustrating, by way of example, the arrangement of a coder of the adaptive predictive processing system of the present invention.

FIG. 3 illustrates an embodiment of the adaptive predictive coding system of the present invention. A speech-sampled input signal S(t) in digital form from the input terminal 1 is split by band-pass filters 2, 3 and 4 into a plurality of frequency bands. Signals of these divided frequency bands are re-sampled by samplers 5, 6 and 7 into sub-band signals $x_i'(t)$, which are subjected to adaptive predictive encoding by adaptive predictive coders 8, 9 and 10 to derive therefrom residual signals $\hat{d}_i(t)$.

Figure 4:
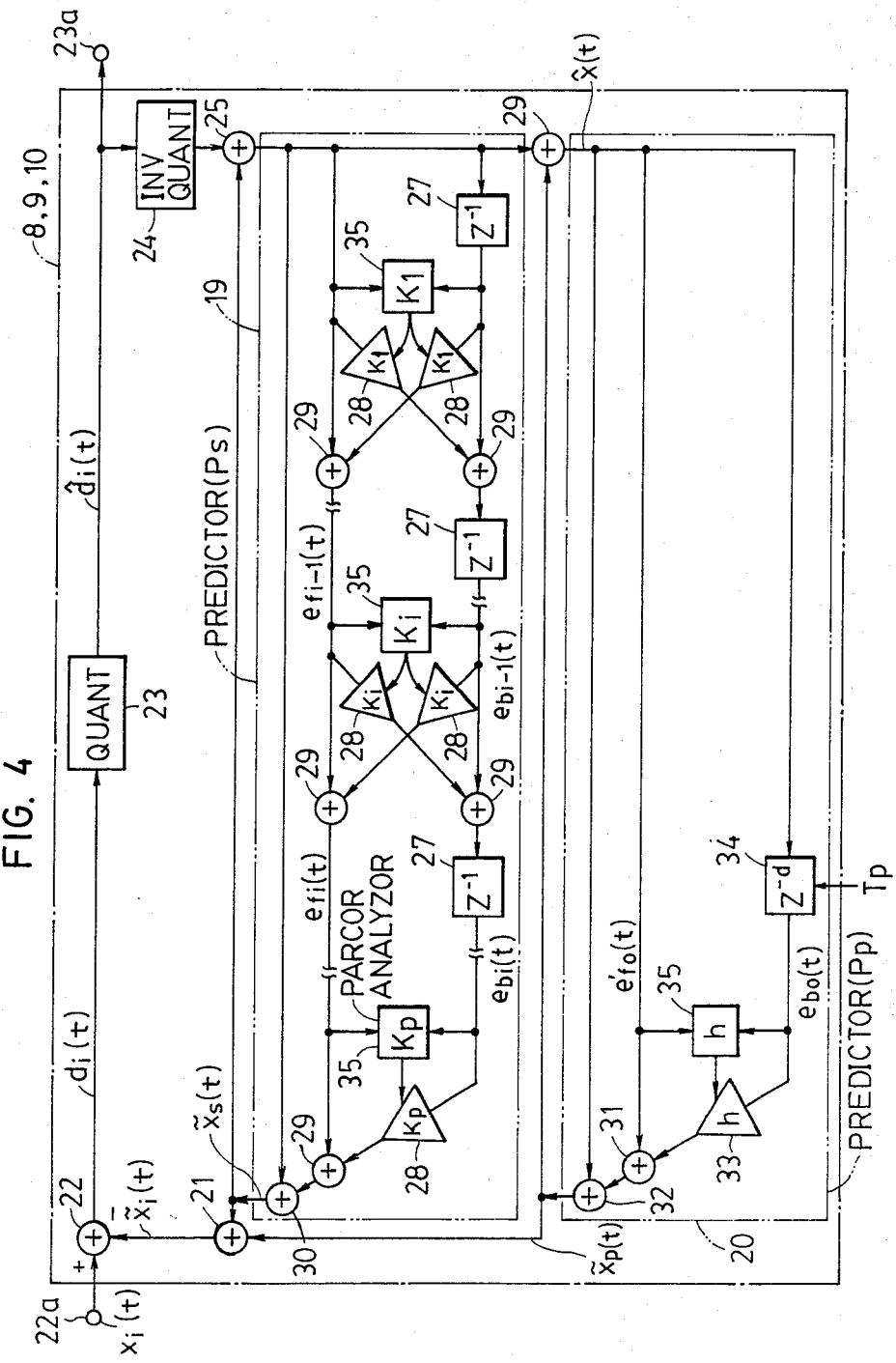
FIG. 4 is a diagram showing a specific example of adaptive predictive coders 8, 9 and 10 used in FIG. 3.

The adaptive predictive coders 8, 9 and 10 are each composed of a predictor (Ps) 19 based on the correlation between adjacent sample values and a predictor (Pp) 20 based on the correlation between sample values spaced one pitch period apart, as shown in FIG. 4. A prediction signal $\bar{x}_i(t)$ is produced by obtaining the sum of prediction valves $\bar{x}_s(t)$ and $\bar{x}_p(t)$ from the two predictors 19 and 20 through the use of an adder 21. A prediction residual signal $d_i(t)$ is produced by obtaining the difference between the input signal from a terminal 22a and the prediction signal from the adder 21 through the use of a subtractor 22. The prediction residual signal thus obtained is quantized by a quantizer 23 and applied via a terminal 23a to a code combiner 17 shown in FIG. 3, and the encoded output in the code combiner 17 is provided via a terminal 18 on a transmission line.

The output $\hat{d}(t)$ from the quantizer 23 is also provided to an inverse quantizer 24, as depicted in FIG. 4, wherein it is decoded. The decoded output from the inverse quantizer 24 is added by an adder 25 to the prediction value $\bar{x}_s(t)$ from the predictor 19, and the added output from the adder 25 is fed back as a local decoded signal to the predictor 19. Further, the output from the adder 25 is added by an adder 26 to the prediction value from the predictor 20 and the added output is fed back to the predictor 20.

The predictor 19 is shown to be made up of P stages of lattice digital filters, each stage being formed by one unit time lag element 27, two multipliers 28 and two adders in a manner to compute the following equation. Internal signals of an ith (i=1, 2, ... P) stage filter, $e_{fi}(t)$ and $e_{bi}(t)$, are obtained by the following equation from internal signals of an (i−1)th stage filter, $e_{fi-1}(t)$ and $e_{bi-1}(t)$:

$$\begin{cases} e_{fi}(t) = e_{fi-1}(t) + K_i(t)e_{bi-1}(t) \\ e_{bi}(t) = K_i(t)e_{fi-1}(t-1) + e_{bi-1}(t-1) \end{cases}$$

$$i = 1, 2, \ldots P, \ e_{b0}(t) = e_{f0}(t-1)$$

where $K_i(t)$ (i=1, 2, ... P) is a PARCOR coefficient, which is the multiplicator of the two multipliers 28, and $e_{f0}(t)$ is the input signal to the predictor 19. A prediction signal which is provided from an adder 30 is given by the following equation:

$$\tilde{x}_s(t) = -\sum_{i=1}^{P} K_i(t)e_{bi-1}(t)$$

On the other hand, the predictor 20 is composed of a single stage of lattice digital filter, in which a time lag element 34 represents a time lag dependent on the pitch period and the sampling period in each band and is implemented by an interpolating digital filter since the time lag usually assumes a value which is a non-integral multiple of the sampling interval of the input signal. The prediction signal of the predictor 20, which is provided from an adder 32 is given by the following equation:

$$\tilde{x}_p(t) = -h(t)\hat{x}(t-d)$$

where h(t) is a PARCOR coefficient, $\hat{x}(t)$ is a local decoded signal which is the input to the predictor 20 and d is the time lag of the time lag element 34. The PARCOR coefficients $K_i(t)$ and h(t) are obtained by a PARCOR analyzer 35 from the internal signals $e_{fi}(t)$ and $e_{bi}(t)$ for each unit time. These predictors 19 and 20 are well-known in the art.

Figure 5:
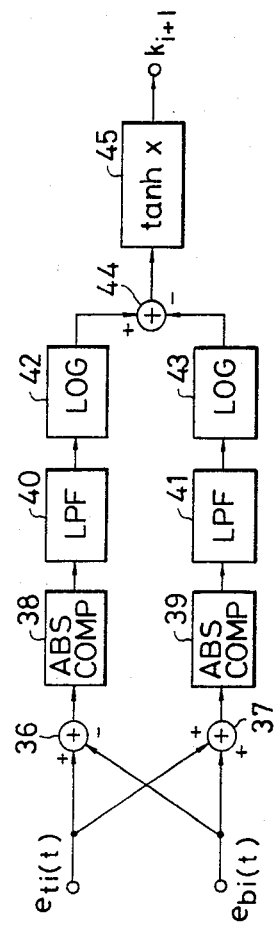
FIG. 5 is a diagram showing a specific example of a PARCOR analyzer employed in FIG. 4.

The PARCOR coefficients are given by the following equations:

$$K_i(t+1) = \tanh\left(\ln\frac{\overline{|e_{fi}(t) - e_{bi}(t)|}}{\overline{|e_{fi}(t) + e_{bi}(t)|}}\right)$$

$$h(t+1) = \tanh\left(\ln\frac{\overline{|\hat{x}(t) - \hat{x}(t-d)|}}{\overline{|\hat{x}(t) + \hat{x}(t-d)|}}\right)$$

where ($\overline{\phantom{TT}}$) denotes a time average. The above equations can be realized by the PARCOR analyzer 35 as shown in FIG. 5, for instance. The signals $e_{fi}(t)$ and $e_{bi}(t)$ are applied to adders 36 and 37, in which $e_{fi}(t) - e_{bi}(t)$ and $e_{fi}(t) + e_{bi}(t)$ are obtained, and these outputs are provided to absolute value computation circuits 38 and 39, wherein their absolute values are obtained. The absolute values are smoothed by smoothing low pass filters 40 and 41, and logarithmic values of the smoothed outputs are obtained by logarithmic value computation circuits 42 and 43. The logarithmic values thus obtained are applied to an adder 44 to detect the difference therebetween. The difference output thus detected is provided to a hyperbolic tangent (tanh x) computation circuit 45 to obtain a hyperbolic tangent, providing the PARCOR coefficient $k_{i+1}$. The abovesaid absolute value computation circuits 38 and 39 may also be replaced with squarers. The logarithmic value computation circuits 42 and 43 and the hyperbolic tangent computation circuit 45 can each be so arranged as to read out data stored in a read only memory.

The quantization bit number and the quantization step size of the quantizer 23 in each of the adaptive predictive coders 8, 9 and 10 in FIG. 3 are adapted in accordance with the mean amplitude of the pseudo-residual signal in the present invention. The pseudo-residual signal corresponds to the residual signal provided from the subtractor 22 (FIG. 4) in the adaptive predictive coder, and the mean amplitude of the pseudo-residual signal has to be computed prior to the activation of the adaptive predictive coder. As shown in FIG. 3, from the sub-band signal of the lowest band, for example, the output from the sampler 5 is detected by a pitch period detector 11 the pitch period Tp of the signal. The detection of the pitch period can be effected in a known manner. That is, an average of the absolute value of the difference between sub-band sample values in the analysis frame is obtained by $$\rho(\tau) = \frac{1}{M - \tau^{-1}} \sum_{t=0}^{M-\tau} |x(t) - x(t+\tau)|$$

where M is the number of samples in the frame, and the pitch period is obtained as such a value of $\tau$ that minimizes the average $\rho(\tau)$ within the range of $\tau_{min} \leq \tau \leq \tau_{max}$. By the pitch period Tp thus detected, the delay time of the delay element 34 in FIG. 4 is controlled.

Figure 6:
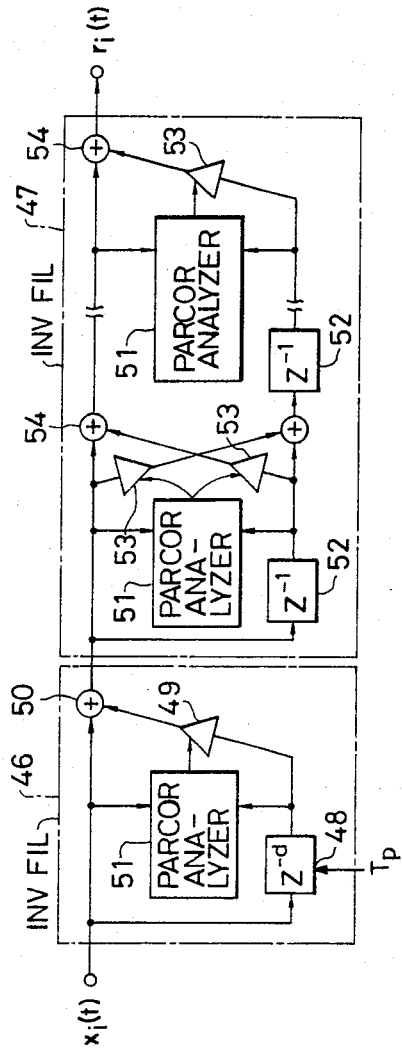
FIG. 6 is a diagram showing a specific example of an inverse filter 12 utilized in FIG. 3.

In an inverse filter circuit 12, from the sub-band signals of the respective bands are obtained their pseudo-prediction residual signals. The inverse filter 12 is one that corresponds to the filter used for the predictors in the adaptive predictive coders 8, 9 and 10, and it is made up of, for instance, a cascade connection of an inverse filter 46 based on a pitch prediction and an inverse filter 47 based on an adjacent correlation as shown in FIG. 6; namely, it is formed by the same lattice digital filters as those employed for the adaptive predictive coder depicted in FIG. 4. Time delay elements 48 and 52 and PARCOR analyzers 51 are identical with the time delay elements 34 and 27 and the PARCOR analyzers 35 used in the adaptive predictive coder shown in FIG. 4.

Figure 7:
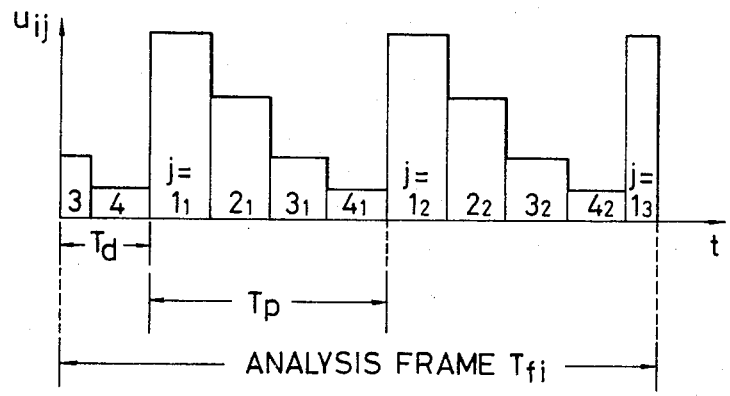
FIG. 7 is a diagram explanatory of a method for setting a sub-interval.

Next, that one of the outputs from the inverse filter 12 which corresponds to the sub-band signal of the lowest frequency band is provided to a sub-interval setting circuit 13, wherein the position of the sub-interval is detected based on the temporal localization of the amplitude of its pseudo-residual signal. As shown in FIG. 7, the pitch period Tp is divided at equal intervals into a plurality of sub-intervals (four sub-intervals in FIG. 7) so that they may repeat periodically. The positions of the sub-intervals are defined by the time length Td from the beginning of the analysis frame to the beginning $1_1$ of a first sub-interval $j = 1_1$, $1_2$ and $1_3$. The time length Td is set so that the mean amplitude in the first sub-interval may become maximum. That is to say, the mean amplitude is obtained by $$u(Td) = \frac{1}{M} \sum_{t \in T} |r_1(t)|$$

where T is the first sub-interval ($1_1$, $1_2$, $1_3$) when the time interval is set to a certain value, M is the number of samples in the first sub-interval and $r_1(t)$ is the pseudo residual signal, and then Td which maximizes u(Td) is obtained in the range of $0 \leq Td < Tp$. In this way, the sub-intervals are set.

Figure 11:
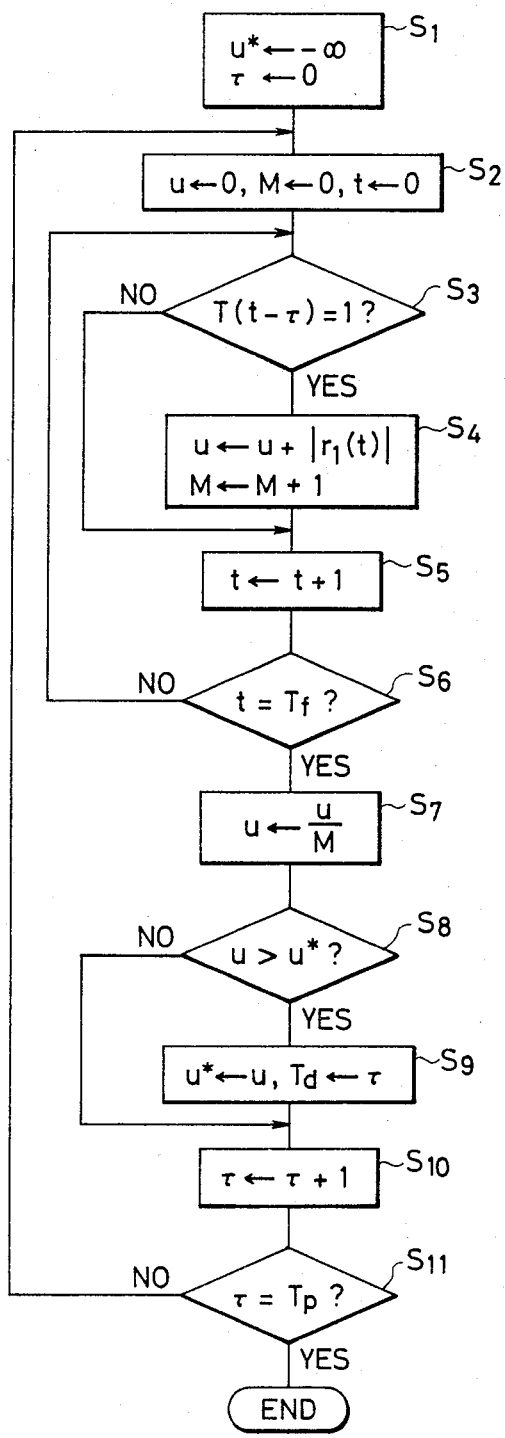
FIG. 11 is a flowchart showing an example of processing for obtaining Td.

The arithmetic processing for setting the temporal position Td can be carried out following a flowchart shown in FIG. 11, for instance. In FIG. 11, in step $S_1$ the mean amplitude u* of the pseudo-residual signal of the sub-interval is set to $-\infty$ and $\tau$ is set as a variable of Td to 0 and, in step $S_2$, the mean amplitude of the pseudo-residual signal of the sub-interval is set to 0 and the number of sample points, M, is set to 0 and, further, a sample point t is set to 0. In step $S_3$ it is checked whether the sample point t lies within the sub-intervals in which the mean amplitude is to obtain. That is, T(t) represents the following equation in which 1 is added to an integral value obtained by dividing by the length of one sub-interval, $Tl = Tp/L$, the remainder of a division of t by the pitch period Tp:

$$T(t) = \left[ \frac{\text{Mod}(t + td, Tp)}{Tl} \right] + 1$$

where [ ] is a Gaussian symbol and indicates the largest integral value in [ ]. In the case of YES in step $S_3$, the pseudo-residual signal $|r_1(t)|$ of that sub-interval is added to u and the number of sample points, M, is incremented by 1 in step $S_4$, which is followed by step $S_5$. In the case of NO in step $S_3$, the operation proceeds to step $S_5$, in which the sample point t is incremented by 1, followed by checking in step $S_6$ whether the sample point t has become a final sample point at the end of the analysis frame length $T_f$. In the case of NO in step $S_6$, the operation goes back to step $S_3$, whereas, in the case of YES in step $S_6$, the operation proceeds to step $S_7$ in which the average amplitude of the pseudo-residual signal in the same sub-interval within the analysis frame is obtained. If it is decided in the next step $S_8$ that the average amplitude u is larger than u*, the average amplitude u is set as u* and $\tau$ is set as Td in step $S_9$, and the operation proceeds to step $S_{10}$. Also in the case of NO in the step $S_8$, the operation proceeds to step $S_{10}$. In step $S_{10}$ the $\tau$ is incremented by 1, which is followed by step $S_{11}$, in which it is checked whether the $\tau$ has become the pitch period Tp. If so, the operation comes to an end and the Td in step $S_9$ at that time becomes a value representing the position of the sub-interval relative to the analysis frame. If not, the operation returns to step $S_2$ and the above-described operation takes place again to obtain the time length Td which maximizes the average amplitude of the pseudo-residual signal of the same sub-interval.

In an average amplitude computation circuit 14 shown in FIG. 3, an average amplitude of the pseudo-residual signal in each sub-interval for each band is obtained by the following equation:

$$u_{ij} = \frac{1}{M_{ij}} \sum_{t \in T_{ij}} |r_i(t)| \quad \begin{array}{l} i = 1, 2, \ldots N \\ j = 1, 2, \ldots L \end{array}$$

where $T_{ij}$ and $M_{ij}$ indicate a jth sub-interval in an ith band and the number of samples contained in the sub-interval, respectively, N is the number of bands into which the input signal is split (N=3 in FIG. 3) and L is the number of periods into which the pitch period is split (L=4 in FIG. 7).

Figure 12:
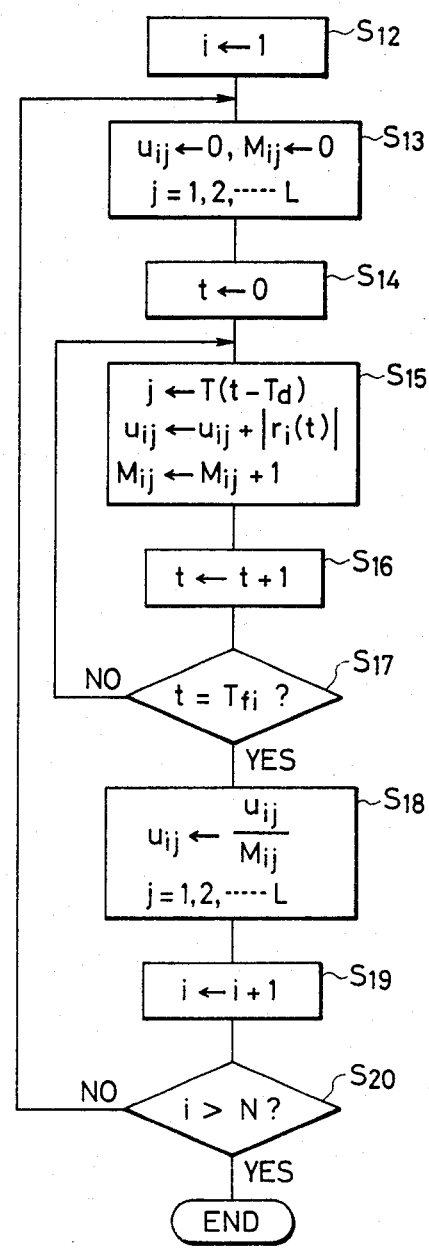
FIG. 12 is a flowchart showing an example of processing for computing $u_{ij}$.

The arithmetic processing for obtaining the average amplitude of the pseudo-residual signal for each sub-interval is performed, for example as shown in FIG. 12. In step $S_{12}$ operation starts with initialization of i=1 and, in step $S_{13}$, $u_{ij}=0$ and $M_{ij}=0$ are initialized for each j=1, 2, ... L, followed by setting of the sample point t to 0 in step $S_{14}$. In step $S_{15}$ the sub-interval j is obtained by the equation of T(t) from T(t−Td) and, for the sub-interval j, $u_{ij}+|r_i(t_1)|$ is computed, that is, the pseudo-residual signals are accumulated and, further, $M_{ij}$ is incremented by 1. In the next step $S_{16}$ t is incremented by 1 and in step $S_{17}$ it is checked whether t has become the final sample point $T_{fi}$. If so, the operation proceeds to step $S_{18}$ and if not, the operation returns to step $S_{15}$. In step $S_{18}$ the accumulated $u_{ij}$ is divided by the number of sample points in the same sub-interval, $M_{ij}$, to obtain the average amplitude for each j = 1,2, ... L. In step $S_{19}$ i is incremented by 1 and in step $S_{20}$ it is checked whether i is larger than N. If not, the operation returns to step $S_{12}$ and if so, the operation comes to an end.

A quantization bit allocation circuit 15 in FIG. 3 performs a computation for determining the quantization bit number from the average amplitude $u_{ij}$. The quantization bit number is determined so that a waveform distortion of a decoded signal resulting from quantization may be minimum relative to a given average bit rate. The waveform distortion in the case of the quantization bit number in the band i and the sub-interval j being represented by $R_{ij}$ is given by the following equation:

$$D = \sum_{i=1}^{N} \sum_{j=1}^{L} c_j \cdot K 2^{-2R_{ij}} a^2 \cdot u_{ij}^2$$

where $c_j$ is the ratio of the time length of each sub-interval to the analysis frame length, a is a constant representing the relationship between an absolute value mean and an effective value, and K is a constant. The average bit rate (bits/sample) in this case is given by the following equation:

$$R = \sum_{i=1}^{N} \sum_{j=1}^{L} w_i \cdot c_j + R_{ij}$$

where $w_i$ is the ratio of the band width of each band to the band width before splitting. The quantization bit number $R_{ij}$ which minimizes the waveform distortion D when the average bit rate R is made constant is given by the following equation:

$$R_{ij} = \max\left( R + \frac{1}{2} \log_2 \frac{\tilde{u}_{ij}}{\prod_{k=1}^{N} \prod_{l=1}^{L} (\tilde{u}_{kl}) w_k c_l}, R_{cij} \right)$$

where $u_{ij} = \tilde{u}_{ij}/w_i$ and $R_{cij}$ indicates the lower limit of the quantization bit number, which is selected so that the quantization bit number in all sub-intervals is a certain band may not be zero. For instance, if $$\{Rc_{ij}\} = \{\overset{\leftarrow L \rightarrow}{1, 0, 0, \ldots, 0}\} \ (i = 1, 2, \ldots, N),$$

one or more bits can always be allocated to the first sub-interval for all the bands.

Figure 13:
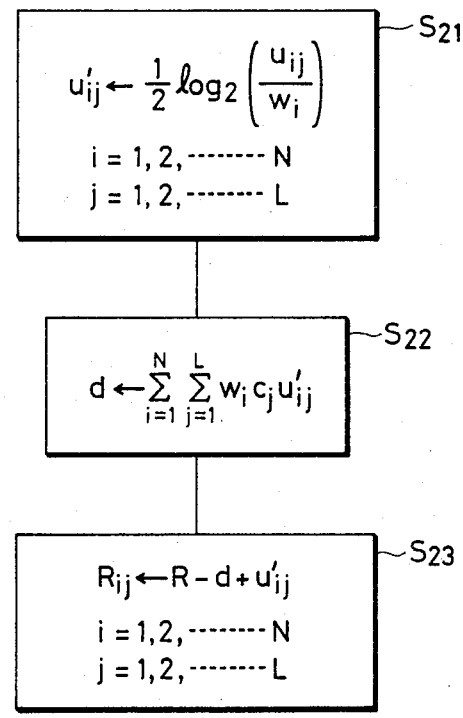
FIG. 13 is a flowchart showing a portion of processing for computing $R_{ij}$.
Figure 14:
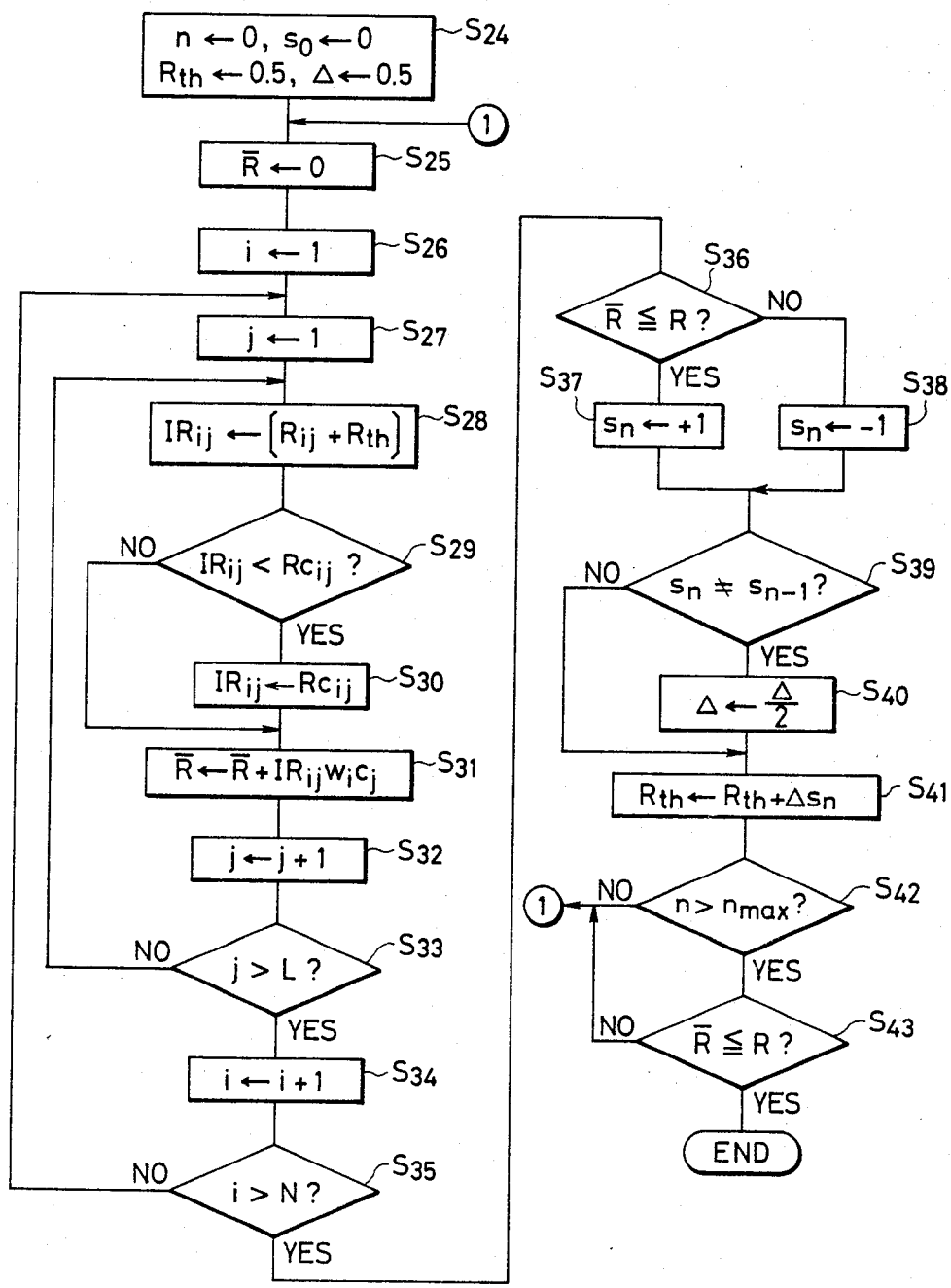
FIG. 14 is a flowchart showing an example of processing for obtaining an integer $IR_{ij}$ of $R_{ij}$.

The computation of $R_{ij}$ is conducted by the processing shown in FIGS. 13 and 14, for instance. In step $S_{21}$ in FIG. 13 a computation $$u'_{ij} = \frac{1}{2} \log_2\left(\frac{\tilde{u}_{ij}}{w_i}\right)$$

is conducted for $i = 1, 2, \ldots N$ and $j = 1, 2, \ldots L$ and, in step $S_{22}$, a computation $$\sum_{i=1}^{N} \sum_{j=1}^{L} w_i c_j u'_{ij}$$

is carried out to perform the computation of the denominator in the equation of $R_{ij}$. In step $S_{23}$ an operation $R - d + u'_{ij}$ is conducted for $i = 1, 2, \ldots N$ and $j = 1, 2, \ldots L$. Since $R_{ij}$ thus computed is not always an integer, it is set to $IR_{ij}$ and a larger one of $IR_{ij}$ and $Rc_{ij}$ is selected and, further, the quantization bit number $\overline{R}$ obtained by the computation is made as close to a preset average bit rate R as possible. To this end, processing such, for example as shown in FIG. 14 is performed. The operation starts with the initialization of $n = 0$, $s_0 = 0$, $R_{th} = 0.5$ and $\Delta = 0.5$ in step $S_{24}$, and $\overline{R} = 0$, $i = 1$ and $j = 1$ are set in steps $S_{25}$, $S_{26}$ and $S_{27}$, respectively. Next, in step $S_{28}$ $R_{th}$ is added to $R_{ij}$ obtained by the processing of FIG. 13 and a maximum value of integers in $R_{ij} + R_{th}$ is set to $IR_{ij}$. In step $S_{29}$ it is checked whether $IR_{ij}$ is smaller than $Rc_{ij}$ and, if so, $Rc_{ij}$ is selected as $IR_{ij}$ in step $S_{30}$ and the operation proceeds to step $S_{31}$. When $IR_{ij}$ is larger than $Rc_{ij}$, the $IR_{ij}$ is adopted as it is and the operation proceeds to step $S_{31}$, in which the average bit rate $\overline{R}$ by the quantization bit number allocated by this $IR_{ij}$ is obtained. In step $S_{32}$ j is incremented by 1 and in step $S_{33}$ it is checked whether j is larger than L. If not, the operation returns to step $S_{28}$ and, if so, the operation proceeds to step $S_{34}$, in which i is incremented by 1. In step $S_{35}$ it is checked whether i is larger than N and if not, the operation proceeds to step $S_{27}$ and, if so, the operation proceeds to step $S_{36}$. In step $S_{36}$ it is checked whether $\overline{R}$ is smaller than the preset average bit rate R and if so, it means that $R_{th}$ can be increased, so that $s_n$ is set to 1 in step $S_{37}$. If not, $R_{th}$ must be decreased and in step $S_{38}$ $s_n$ is set to 1. In step $S_{39}$ it is checked whether $s_n$ does not coincide with the previous one and if they are not coincident with each other, it is decided that $s_n$ takes $+1$ and $-1$ alternately. And in step $S_{40}$ $\Delta$ is set to $\Delta/2$ and the operation proceeds to step $S_{41}$. In the case where coincidence is detected, the operation proceeds directly to step $S_{41}$. In step $S_{41}$ $\Delta \times s_n$ is added to $R_{th}$. In step $S_{42}$ it is checked whether n is larger than a predetermined number $n_{max}$. If not, the operation returns to step $S_{25}$ and, if so, the operation proceeds to step $S_{43}$, in which $\overline{R}$ and R are compared again to make sure that the former is smaller than the latter. If so, the operation comes to an end and, if not, the operation returns to step $S_{25}$ to make $\overline{R}$ smaller than R at all times.

In a quantization step size adaptation circuit 16 the quantization step size of a linear quantizer is determined by the average amplitude of the residual signal and the quantization bit number.

$$\Delta_{ij} = a \cdot u_{ij} \cdot Q(R_{ij})$$

where $Q(R_{ij})$ represents the quantization step size which minimizes a quantization error in the case where a signal of a zero average and unit variance is quantized by $R_{ij}$ bits and which is determined in dependence on the probability distribution of the signal.

In the computation of $\Delta_{ij}$, $aQ(R_{ij})$ is stored in the form of a table and, by referring to this table using $R_{ij}$ and its output is multiplied by a and $u_{ij}$. $Q(R_{ij})$ is described, for instance, in IRE Trans. Information Theory, Vol IT-6, pp 7-12, 1960, March. In the case of speech, a is close to the Gaussian distribution and can be set to $$a = \sqrt{\frac{\pi}{2}}.$$

It is sufficient to store $aQ(R_{ij})$ in the form of a table.

In the code combiner 17, a quantized residual signal of each band and parameter information, that is, the period Tp of the sub-interval, the position Td and the average amplitude of the pseudo-residual signal, are encoded and delivered via the terminal 18 onto the transmission line.

Figure 8:
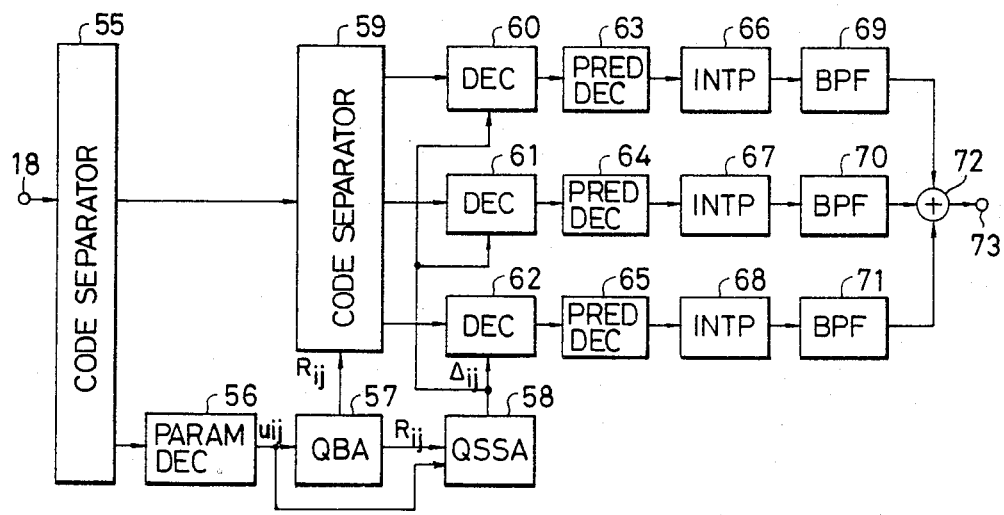
FIG. 8 is a block diagram illustrating, by way of example, a decoder of the adaptive predictive processing system of the present invention.

FIG. 8 illustrates an embodiment for decoding a signal from an adaptive-predictive-encoded code series. A code series applied via a terminal 141 from the transmission line is separated by a code separator 55 into a code series of the residual signal and a code series of the parameter information, and the parameter information is decoded in a parameter decoder 56. In a quantization bit allocation circuit 57, the quantization bit $R_{ij}$ is computed from the decoded average amplitude $u_{ij}$ in the manner described previously and, based on this, the code series of the residual signal of each band is separated into codes for each sample value in a code separator 59. In a quantization step size allocation circuit 58, the quantization step size is computed by the aforementioned method from the average amplitude $u_{ij}$, on the basis of which the residual signals are decoded by decoders 60, 61 and 62. Prediction filter circuits 63, 64 and 65 receive the residual signals and output the sub-band signals of the respective bands.

The prediction filter circuits 63, 64 and 65 are each composed of prediction filters 74 and 75 (FIG. 9) which are based on the adjacent correlation and the pitch correlation, respectively, and which are formed by a lattice digital filter comprising a unit time delay element 81, multipliers 82 and adders 83, and a lattice digital filter comprising a time delay element 84, a multiplier 85 and an adder 86, respectively, as is the case with the predictors 19 and 20 in the adaptive predictive coder. Simultaneously with signal filtering processing, filter coefficients $K_i$ and h are successively estimated by PARCOR analyzers 87.

The sub-band signals are sampled by interpolators 66, 67 and 68 with the same sampling period as that of the input speech signal. That is, a sample of a zero value is inserted between sample values of each sub-band signal. Band-pass filters 69, 70 and 71 filter the interpolator outputs with filters having the same characteristics as the band-pass filters 2, 3 and 4 shown in FIG. 3. The filter outputs are added by an adder 72 and its decoded signal is provided at an output terminal 73. The operations described above with regard to FIGS. 3 to 8 can also be carried out by the use of a microcomputer.

Figure 9:
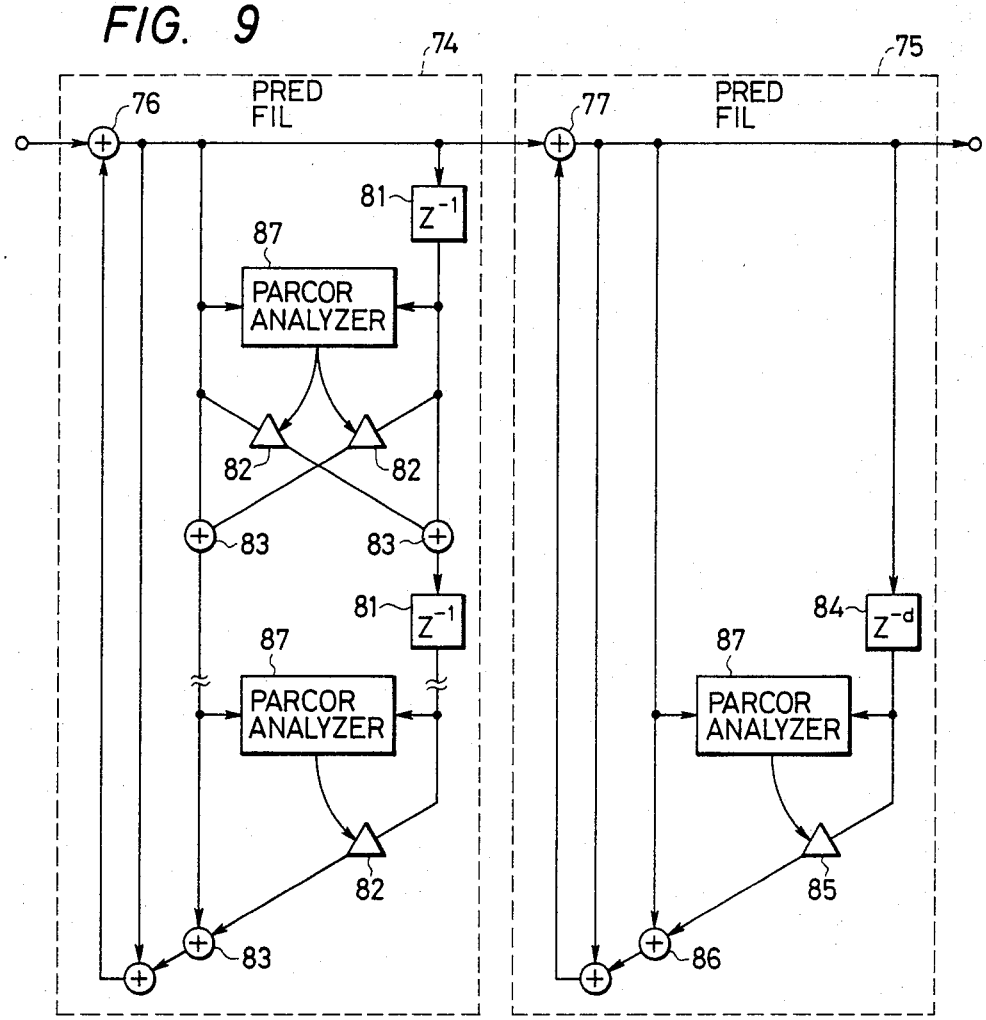
FIG. 9 is a diagram showing a specific example of predictive decoders 63, 64 and 65 used in FIG. 8.

In FIG. 4, one of the predictors 19 and 20 may also be omitted, in which case the corresponding parts in FIGS. 6 and 9 are left out. Also it is possible to replace the predictors 19 and 20 with each other in FIG. 4 and, in this case, the inverse filters 46 and 47 are replaced with each other in FIG. 6.

Figure 10:
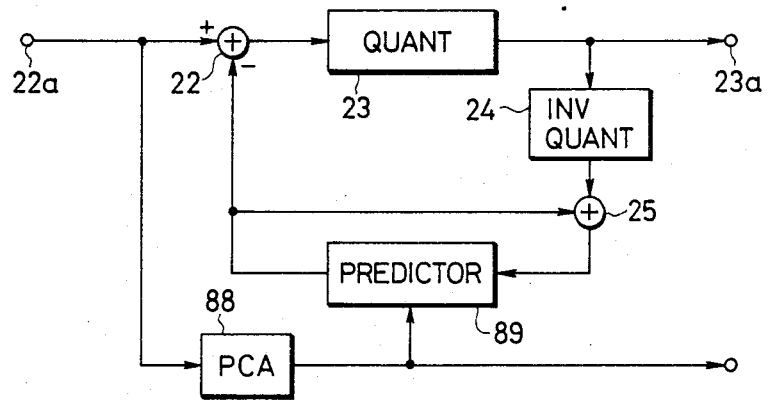
FIG. 10 is a block diagram illustrating another example of the coder in the adaptive predictive processing system of the present invention.

Furthermore, in FIG. 4, the quantized prediction residual signal at the terminal 23a is decoded, from which the PARCOR coefficient is successively estimated and the backward type adaptive predictive coders are employed, but it is also possible to adopt such a circuit arrangement of the type shown in FIG. 10 in which the PARCOR coefficient is analyzed by a predictive coefficient adaptation circuit 88 from the input signal applied to an input terminal 22a and the filter coefficient of a predictor 89 composed of a lattice digital filter, thereby to obtain the prediction signal. In other words, the adaptive predictive coders 8, 9 and 10 may also be the forward type. In this case, the PARCOR coefficient obtained with the predictive coefficient adaptation circuit 88 is transmitted to the receiving side.

Figure 15:
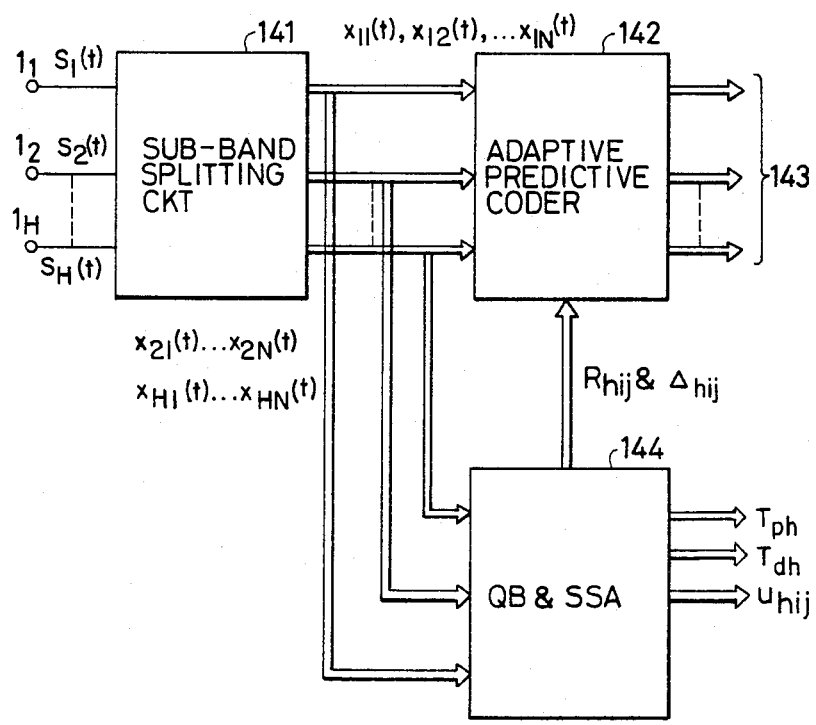
FIG. 15 is a block diagram illustrating an embodiment of the present invention as being applied to a multi-channel system.

The present invention is applicable, for instance, to the adaptive bit allocation to a plurality of channels of a stereo signal. For example as shown in FIG. 15, signals of H channels are provided from input terminals $1_1$ to $1_H$ to sub-band splitting circuit 141, wherein the input signal of each channel is split into N frequency bands and, at the same time, they are translated into sub-band signals as described previously in conjunction with the sub-band splitting circuit 101 in FIG. 3. The sub-band signals of the respective channels are subjected to adaptive predictive coding by the same circuit arrangements as the adaptive predictive coders 8, 9 and 10 constituted by the lattice filters as shown in FIG. 3. And residual data 143 are provided. On the other hand, the sub-band signals are also provided from the sub-band splitting circuit 141 to a quantization bit and step size adaptation circuit 144. In the quantization bit and step size adaptation circuit 144, the average amplitude of the pseudo-residual signal for each sub-band signal is obtained for each sub-interval, for instance, by the same method as that described previously with respect to FIG. 3. Letting the average amplitude of the pseudo-residual signal in a jth sub-interval of an ith band of an hth channel be represented by $u_{hij}$, the quantization bit number $R_{hij}$ and the quantization step size $\Delta_{hij}$ in the jth sub-interval of the ith band of the hth channel are obtained by the following equations:

$$R_{hij} = \max\left\{ R + \tfrac{1}{2}\log_2 \frac{\tilde{u}_{hij}}{\frac{H}{\pi} \frac{N}{\pi} \frac{L}{\pi} (\tilde{u}_{mkl})^{w_k c_l} \frac{1}{H}}, Rc_{hij} \right\}$$

where R is the average bit rate (bits/sample) for the signals of the H channels.

$$\tilde{u}_{hij} = \frac{u_{hij}}{w_i}$$

$$\Delta_{hij} = a \cdot \tilde{u}_{hij} \cdot Q(R_{hij})$$

Based on $R_{hij}$ and $\Delta_{hij}$ thus obtained, the quantization bit number and the quantization step size in each sub-interval of each sub-band signal in each channel are adaptively set.

As has been described in the foregoing, according to the adaptive predictive coding system of the present invention, the conventional band-splitting temporal splitting methods are not employed and the signal-to-quantization noise ratio is improved about 6 dB as compared with that in the adaptive predictive coding system which does not utilize the adaptive bit allocation technique. The toll quality is improved more than the abovesaid numerical value, and it has been confirmed that the toll quality obtainable with the prior art can be achieved at a bit rate of 16 Kb/s. Furthermore, in the system of the present invention, the computation of the pitch period and the PARCOR coefficient in the inverse filter 12 and the adaptation of the quantizer are performed based on the computation for obtaining the average value of the absolute values of the signals, so that in the case of implementing this invention system for digital signal processing, the computation word length is substantially the same as the word length of the input signal; namely, the word length can be reduced by half as compared with the word length needed in the case of effecting the adaptive quantization based on the computation of power. Moreover, the number of multiplications involved is also decreased. Conversely speaking, if the word length is selected equal to that used in conducting the computation by computing power, then high precision coding can be effected, providing for enhanced performance. Besides, it is necessary in the prior art to perform the bit allocation in the sub-interval by the temporal bit allocation circuit 132 after the computation in the inter-sub-band bit allocation circuit 131 as shown in FIG. 1. In the present invention, however, $R_{ij}$ can be obtained directly by the quantization bit allocation circuit 15 as described previously and, consequently, the throughput is reduced. Further, the prior art example of FIG. 1 calls for the square root computation circuit 134 for the quantization step size adaptation, but the present invention does not require such a circuit. In the case where the computation of the PARCOR coefficients in the adaptive predictive coder is based on the average absolute value of the signal as described in respect of the foregoing embodiment, the word length is made uniform throughout the system; this makes it easier to perform the processing and eliminates the necessity of the multiplications and divisions which take place in the predictive coefficient computation circuit 128 in FIG. 2, reducing the scale of the hardware used as shown in FIG. 6, for instance. In addition, in the case where the predictive coding and the decoding circuit are constituted by the same type of circuits as in the embodiments of FIGS. 3 and 8 and the PARCOR coefficients are successively estimated from the decoded signal on either of the transmitting and the receiving side, there is no need of transmitting the PARCOR coefficients and, in consequence, the quantity of information therefor can be allocated to the quantization of the residual signal, improving the performance for coding. Incidentally, since the predictor utilizing the lattice filter is stable when the PARCOR coefficients are smaller than unity, it is sufficient at the time of determining the adaptive quantization bit number and the quantization step size to seek the condition for stability; this ensures the stability of the filter in the predictive coder.

It will be apparent that many modifications and variations may be effected without departing from the scope of the novel concepts of the present invention.

What is claimed is:

1. An adaptive predictive processing system comprising:

sub-band splitting means for splitting an input signal into a plurality of sub-bands and producing sampled sub-band signals from the respective sub-bands;

adaptive predictive coding means connected to the respective outputs of said sub-band splitting means for subjecting the respective sub-band signals to adaptive predictive coding and producing adaptively quantized residual signals for the respective sub-bands, each of said adaptive predictive coding means including linear predictor means for producing a predicted value signal based on the quantized residual signal, a subtractor for receiving corresponding one of the subband signals from the input of said adaptive predictive means and the predicted value signal from said predictor means and providing therefrom a difference therebetween as a prediction residual signal, quantizer means connected to the output of said subtractor for producing the quantized residual signal, and adder means having inputs connected to the output sides of said quantizer means and said linear predictor means for adding the quantized residual signal and the predicted value signal to produce a locally decoded sub-band signal and supplying the locally decoded sub-band signal to the input of said linear predictor means;

inverse filter means connected to the respective outputs of said sub-band splitting means for producing pseudo-residual signals of the respective sub-bands by subjecting the respective sub-band signals to inverse filtering processes;

pitch detecting means connected to one of the outputs of said sub-band splitting means corresponding to the lowest subband, for detecting a pitch period $T_p$ of the sub-band signal;

sub-interval setting means connected to the output of said pitch detecting means and one of the outputs of said inverse filter means corresponding to the lowest sub-band, for dividing a pitch interval in the pseudo-residual signal equal to the detected pitch period into a plurality of sub-intervals and setting a sub-interval position $T_d$ of the pitch interval relative to an analysis frame in the pseudo-residual signal;

average amplitude detecting means connected to the respective outputs of said inverse filter means and the output of said sub-interval setting means, for detecting average amplitudes Uij of the pseudo-residual signals in the respective subbands during each of the sub-intervals;

quantization bit number allocation means connected to the outputs of said average amplitude detecting means, for receiving the detected average amplitudes Uij of the respective pseudo-residual signals during each of the sub-intervals and computing, from the average amplitudes Uij, a number of bits Rij to be allocated to each of the sub-intervals in the respective sub-bands; and quantization step size computing means connected to the outputs of said quantization bit number allocation means and the output of said average amplitude detecting means, for receiving therefrom the computed allocation bit numbers Rij and the average amplitudes Uij and computing, from the allocation bit numbers and the average amplitudes, quantization step sizes $\Delta_{ij}$ for the respective sub-intervals in the respective sub-bands, wherein the allocation bit numbers Rij from said quantization bit number allocation means and the quantization step sizes $\Delta_{ij}$ from said quantization step size computing means are supplied to said quantizer means in said adaptive predictive coding means of the corresponding sub-band, thereby to adaptively control therewith the quantization of the prediction residual signals in the respective sub-bands.

2. An adaptive predictive processing system according to claim 1 wherein the quantization bit number allocation means is means for selecting, as the quantization bit number $R_{ij}$ in a jth subinterval of an ith one of the plurality of sub-band signals, a larger one of $$R + \tfrac{1}{2} \log_2 \frac{\tilde{u}_{ij}}{\prod_{k=1}^{N} \prod_{l=1}^{L} (u_{kl}) w_k c_l}$$

and Rc$_{ij}$ where R (bits/sample) is the average quantization bit number, $$\tilde{u}_{ij} = \frac{u_{ij}}{w_i},$$

u$_{ij}$ is the average amplitude of the pseudo-residual signal in the jth sub-interval of the ith subband and w$_i$ is a band width ratio given by dividing the width of the sub-band by the width of the entire band.

3. An adaptive predictive processing system according to claim 2 wherein the quantization step size computing means determines the quantization step size $\Delta_{ij}$ in the jth sub-interval of the ith sub-band signal by au$_{ij}\times$Q(R$_{ij}$), where a is a constant representing the relation between an average absolute value and an effective value and Q(R$_{ij}$) is a quantization step size which minimizes a quantization error in the case of quantizing a signal of an average 0 and variance 1 by R$_{ij}$ bits and which is determined depending on the probability distribution of the signal.

4. An adaptive predictive processing system according to claim 1, 2 or 3, wherein said linear predictor means in each of said adaptive predictive coding means comprises a lattice type PARCOR filter and PARCOR analyzer means incorporated in the respective lattice stages of said PARCOR filter for producing PARCOR coefficients K$_i$ which are used to adaptively control the filter coefficients of said PARCOR filter, thereby making said adaptive predictive coding means of a backward type.

5. An adaptive predictive processing system according to claim 1, 2 or 3, wherein said adaptive predictive coding means is of a forward type and each of said linear predictor means comprises a lattice type PARCOR filter, filter coefficients of which are controlled by PARCOR coefficients obtained by subjecting the corresponding sub-band signals to lattice type PARCOR analysis.

6. An adaptive predictive processing system according to claim 4 wherein the linear predictor means generates a predicted value signal based on successive correlations between adjacent sample values of the input signal.

7. An adaptive predictive processing system according to claim 6 wherein the linear predictor means generates the predicted value signal based on successive correlations between sample values spaced apart the pitch period of the input signal in addition to the correlation between the adjacent sample values of the input signal.

8. An adaptive predictive processing system according to claim 4 wherein said linear predictor means generates a predicted value signal based on the correlation between sample values spaced apart the pitch period of the input signal.

9. An adaptive predictive processing system according to claim 4 wherein said inverse filter means comprises in each of the sub-bands a second lattice type PARCOR filter and second PARCOR analyzer means incorporated in the respective lattice stages of said second PARCOR filter for producing second PARCOR coefficients which are used to control the filter coefficients of said second PARCOR filter.

10. An adaptive predictive processing system according to claim 4 wherein said PARCOR analyzer means at each lattice stage comprises means for obtaining the sum of two signals and the difference therebetween at each stage of the lattice type filter, means for obtaining the absolute values of the sum and the difference signal, means for smoothing the absolute values of the sum and the difference signal, means for computing a logarithmic value of each of the smoothed values, and means for computing a hyperbolic tangent of the difference between the logarithmic values to output the PARCOR coefficient.

11. An adaptive predictive processing system according to claim 1 wherein said sub-interval setting means determines the position of the pitch interval with respect to the analysis frame so that the average amplitude in the first sub-interval in the pitch interval may become the largest.

12. An adaptive predictive processing system which decodes a speech signal based on a code series of received quantized residual signal, an average amplitude signal of a pseudo-residual signal for each sub-interval of each sub-band and sub-interval information including pitch information and sub-interval position information, comprising:
  quantization bit number allocating means for computing a quantization bit number of each sub-interval of each sub-band from the average amplitude signal;
  code separating means for separating the code series of the quantized residual signal for each sub-band based on the quantization bit number allocated to each sub-interval in each sub-band with said quantization bit number allocating means;
  quantization step size allocating means connected to the output side of said quantization bit number allocating means, for determining a quantization step size of each sub-interval of each sub-band based on the quantization bit number of each sub-band and the average amplitude signal;
  decoding means connected to the output side of said code separating means for decoding and regenerating from the separated codes of the residual signal for each sub-band, a decoded residual signal for each sub-band through using the quantization step sizes and the quantization bit numbers corresponding thereto;
  lattice type predictive filter means connected to the output side of said decoding means for predictively reconstructing respective sub-band signals of the sub-bands in accordance with the decoded residual signals; and
  combining means connected to said predictive filter means for composing a speech signal from the reconstructed sub-band signals.

13. An adaptive predictive processing system comprising:
  sub-band splitting means for splitting each input signal of a plurality of channels into a plurality of frequency sub-bands and producing sampled sub-band signals from the respective sub-bands in each channel;
  adaptive predictive coding means connected to the respective outputs of said sub-band splitting means, for subjecting the sub-band signals of each channel to adaptive predictive coding by use of a lattice type filter in a linear predictor provided in each of said adaptive predictive coding means; and
  quantization bit and step size adaptation means connected to the respective outputs of said sub-band splitting means, for generating pseudo-residual signals of the respective sub-bands for each channel by subjecting the respective sub-band signals to inverse filtering processes, for detecting the pitch periods of the input signals of the respective channels, for dividing each of the pseudo-residual signals in an interval of the corresponding pitch period into a plurality of sub-intervals, the pitch intervals having positions defined relative to an analysis frame, for detecting average amplitudes of the pseudo-residual signals, and for adaptively computing from the average amplitudes, for each sub-interval, a quantization step and a quantization bit number to be used for adaptive quantization in said adaptive predictive coding means.

14. An adaptive predictive processing system according to claim 13 wherein the quantization bit and step size adaptation means selects as the quantization bit number $R_{hij}$ in a jth sub-interval of an ith sub-band signal corresponding to an hth one of the input signals of the plurality of channels, a larger one of $$R + \frac{1}{2} \log_2 \frac{\tilde{u}_{hij}}{\prod\limits_{m=1}^{H} \prod\limits_{k=1}^{N} \prod\limits_{l=1}^{L} (\tilde{u}_{hij}) w_k c_l \frac{1}{H}} \text{ and } Rc_{hij}$$

where R (bits/sample) is an average quantization bit number of an H channel signal and $$\tilde{u}_{hij} = \frac{u_{hij}}{w_i},$$

$u_{hij}$ being an average amplitude of the pseudo-residual signal in the jth sub-interval of the ith sub-band and $w_i$ is a band width ratio given by dividing the band width of the sub-band by the width of the entire band.

15. An adaptive predictive processing system according to claim 14 wherein the quantization bit and step size adaptation means determines the quantization step size $\Delta_{hij}$ in the jth sub-interval of the ith sub-band signal of the hth channel by $a \cdot u_{hij} \cdot Q(R_{hij})$, where a is a constant representing the relation between an average absolute value and an effective value and $Q(R_{hij})$ is a quantization step size which minimizes a quantization error in the case of quantizing a signal of a zero average and unit variance by $R_{hij}$ bits and which is determined depending on the probability distribution of the signal.

* * * * *